(12) United States Patent
Schricker et al.

(10) Patent No.: US 7,945,364 B2
(45) Date of Patent: May 17, 2011

(54) SERVICE FOR IMPROVING HAULAGE EFFICIENCY

(75) Inventors: David R. Schricker, Princeville, IL (US); Anthony R. Fratini, Decatur, IL (US); Jon R. Greiner, Dunlap, IL (US); Christopher M. Sprock, Decatur, IL (US)

(73) Assignee: Caterpillar Inc., Peoria, IL (US)

( * ) Notice: Subject to any disclaimer, the term of this patent is extended or adjusted under 35 U.S.C. 154(b) by 781 days.

(21) Appl. No.: 11/239,227

(22) Filed: Sep. 30, 2005

(65) Prior Publication Data

US 2007/0078579 A1    Apr. 5, 2007

(51) Int. Cl.
G06F 7/70    (2006.01)

(52) U.S. Cl. ........... 701/50; 701/29; 701/70; 701/72; 701/103; 340/442; 340/438; 340/905; 73/146; 73/114.06; 73/760; 73/105; 73/114.16

(58) Field of Classification Search ........... 701/50, 701/53, 65; 702/137; 340/905, 442; 180/167, 180/271
See application file for complete search history.

(56) References Cited

U.S. PATENT DOCUMENTS

| | | | |
|---|---|---|---|
| 4,839,835 A * | 6/1989 | Hagenbuch | 702/174 |
| 5,526,266 A | 6/1996 | Rutan et al. | |
| 5,531,122 A * | 7/1996 | Chatham et al. | 73/760 |
| 5,736,939 A * | 4/1998 | Corcoran | 340/905 |
| 5,737,215 A | 4/1998 | Schricker et al. | |
| 5,808,907 A | 9/1998 | Shetty et al. | |
| 5,817,936 A | 10/1998 | Schricker | |
| 5,848,371 A | 12/1998 | Creger | |
| 5,961,560 A | 10/1999 | Kemner | |
| 6,436,005 B1 * | 8/2002 | Bellinger | 477/111 |
| 6,721,680 B2 | 4/2004 | Sorrells et al. | |
| 6,757,604 B2 | 6/2004 | Carlson et al. | |
| 6,839,638 B2 | 1/2005 | Lueschow et al. | |
| 6,842,680 B2 | 1/2005 | Doddek et al. | |
| 6,858,809 B2 | 2/2005 | Bender | |
| 7,201,244 B2 * | 4/2007 | Johnston et al. | 180/65.5 |
| 2004/0122580 A1 * | 6/2004 | Sorrells | 701/80 |
| 2004/0122618 A1 | 6/2004 | Suzuki et al. | |
| 2005/0085973 A1 * | 4/2005 | Furem et al. | 701/50 |

OTHER PUBLICATIONS

Cannon, U.S. Appl. No. 11/092,612, filed Mar. 30, 2005 (22 pages).
Uken et al., U.S. Appl. No. 11/030,059, filed Jan. 7, 2005 (30 pages).

* cited by examiner

Primary Examiner — Mark Hellner
Assistant Examiner — Redhwan Mawari

(57) ABSTRACT

A process of enabling and providing a service for improving haulage efficiency in a haulage system includes identifying a customer who may benefit from the service. Haulage vehicles of a fleet of haulage vehicles are equipped with a system for monitoring haulage parameters of the haulage vehicles. Equipment for gathering data on the monitored haulage parameters and for gathering information on haulage vehicle location along haul roads is provided. Target haulage parameters which result in desired haulage system performance are determined. The data is analyzed and deviations of actual haulage system performance from desired haulage system performance are determined.

20 Claims, 3 Drawing Sheets

SERVICE FOR IMPROVING HAULAGE EFFICIENCY

TECHNICAL FIELD

The present disclosure is directed to a haulage service and, more particularly, to a method and a system for enabling an entity to provide a service for improving haulage efficiency.

BACKGROUND

Mining and large scale excavating operations may require fleets of haulage vehicles to transport excavated material, such as ore or overburden, from the area of excavation to a destination. For such an operation to be productive and profitable, the fleet of haulage vehicles must be efficiently operated. Efficient operation of a fleet of haulage vehicles is affected by numerous parameters. For example, the grade and character of haul roads and the amount of payload have direct effects on haulage cycle time, equipment component wear, and fuel usage which, in turn, directly affect productivity and profitability of the operation.

In order to permit the fleet of haulage vehicles to effectively transport material, haul roads must be of suitable character and grade to reduce rolling resistance, permit an efficient operator gear shift pattern, and otherwise facilitate efficient haulage vehicle operation. Beyond the impact of a particular grade and a particular rolling resistance on operational efficiency, grade variation and rolling resistance variation can adversely affect the operation. Additionally, payloads must be monitored to ensure against overload or payload variations that may result in operational inefficiencies.

Haulage vehicles in a fleet may be provided with technology for monitoring various operating parameters in order, for example, to provide an assessment of equipment maintenance requirements, or to determine whether payloads are within specifications, or to detect abnormal road conditions. Data from monitoring equipment may be collected, processed, and compared to a standard in order to give an indication of corrective measures that may be desired or required.

A method for detecting an abnormal condition of a road surface is disclosed in U.S. Pat. No. 5,817,936 to Schricker, wherein a plurality of machine parameters are sensed as a mobile machine traverses a segment of a road. These parameters are then used to calculate a resistance factor for the road segment. The calculated resistance factor is compared with an average resistance factor and an abnormal condition of the road surface is thus detected. However, the method of U.S. Pat. No. 5,817,936 does not envision a process of providing an overarching service to improve haulage system performance. Rather, the method disclosed in U.S. Pat. No. 5,817,936 is limited to detection of road segments that vary from the norm.

There is a market for various monitoring technology for a haulage vehicle fleet and a market for equipment and services that enable the corrective action needed when monitoring technology indicates that corrective action is necessary. In addition, there is a market for the services of an entity capable of providing the expertise and marshalling the resource necessary to improve the overall efficiency of a large scale haulage operation.

The present disclosure is directed to a method and system that both enable and provide a service for improving haulage efficiency for a fleet of haulage vehicles.

SUMMARY OF THE INVENTION

One aspect of the present disclosure is directed to a process for enabling an entity to provide a service for improving haulage efficiency in a haulage system. The process includes identifying a customer who may benefit from the service and then equipping haulage vehicles of a fleet of haulage vehicles with a system for monitoring haulage parameters of the haulage vehicles. Equipment for gathering data on the monitored haulage parameters and for gathering information on haulage vehicle location along haul roads of the haulage system is provided. The target haulage parameters which result in desired haulage system performance are determined. The data is analyzed and deviations of the haulage system from target haulage system performance are determined.

In another aspect, the present disclosure is directed to a system for enabling an entity to provide a service for improving haulage efficiency in a haulage system. The system includes monitoring equipment for monitoring parameters associated with the operation of a haulage vehicle and for generating current data related to the parameters during operation of the haulage vehicle. On-board computer systems are adapted for installation on haulage vehicles of a fleet of haulage vehicles and are configured to receive and process data generated by the monitoring equipment. An off-board central computer system is configured to receive and process information from the on-board computer systems and compare the information with predetermined data to yield results. The off-board computer system is further configured to generate at least one report presenting an analysis of the results yielded by the comparison made by the off-board computer system. A report is then generated forming the basis for a recommendation for modification of the haulage system tending to improve haulage efficiency.

It is to be understood that both the foregoing general description and the following detailed description are exemplary and explanatory only and are not restrictive of the invention, as claimed.

DETAILED DESCRIPTION

Reference will now be made in detail to an exemplary embodiment with reference to the accompanying drawings.

Figure 1:
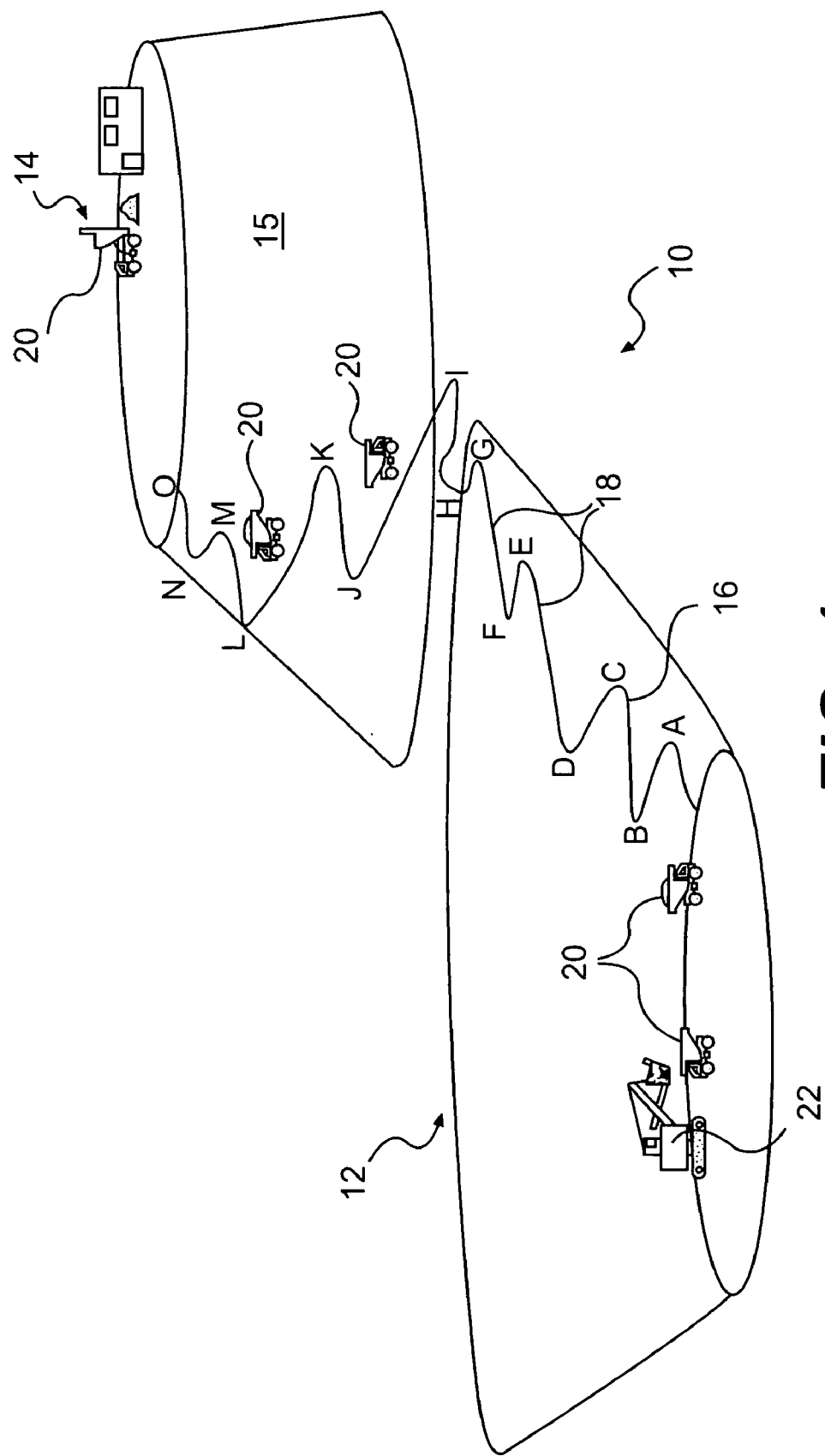
FIG. 1 is a schematic and diagrammatic representation of an exemplary mine layout suitable for implementation of a disclosed embodiment.

FIG. 1 schematically and diagrammatically illustrates an open pit mine operation 10 including an open pit mine 12 and a processing region 14 which may be, but is not required to be, on top of a dumping mound 15. The open pit mine 12 is connected to the processing region 14 by at least one haul road 16, which includes haul road segments 18 between designated letters A, B, C, etc. Haul road 16 may be one of a number of haul roads. A fleet of haulage vehicles 20 may travel from the area of excavation of the open pit mine 12 along the haul road 16 to the processing region 14. In the open pit mine 12, a suitable work machine 22 may operate to excavate material, which may be ore or overburden, and which may be suitably loaded into the haulage vehicles 20. Accordingly, the haulage vehicles 20 carry a payload when traveling from the open pit mine 12 to the processing region 14.

Figure 2:
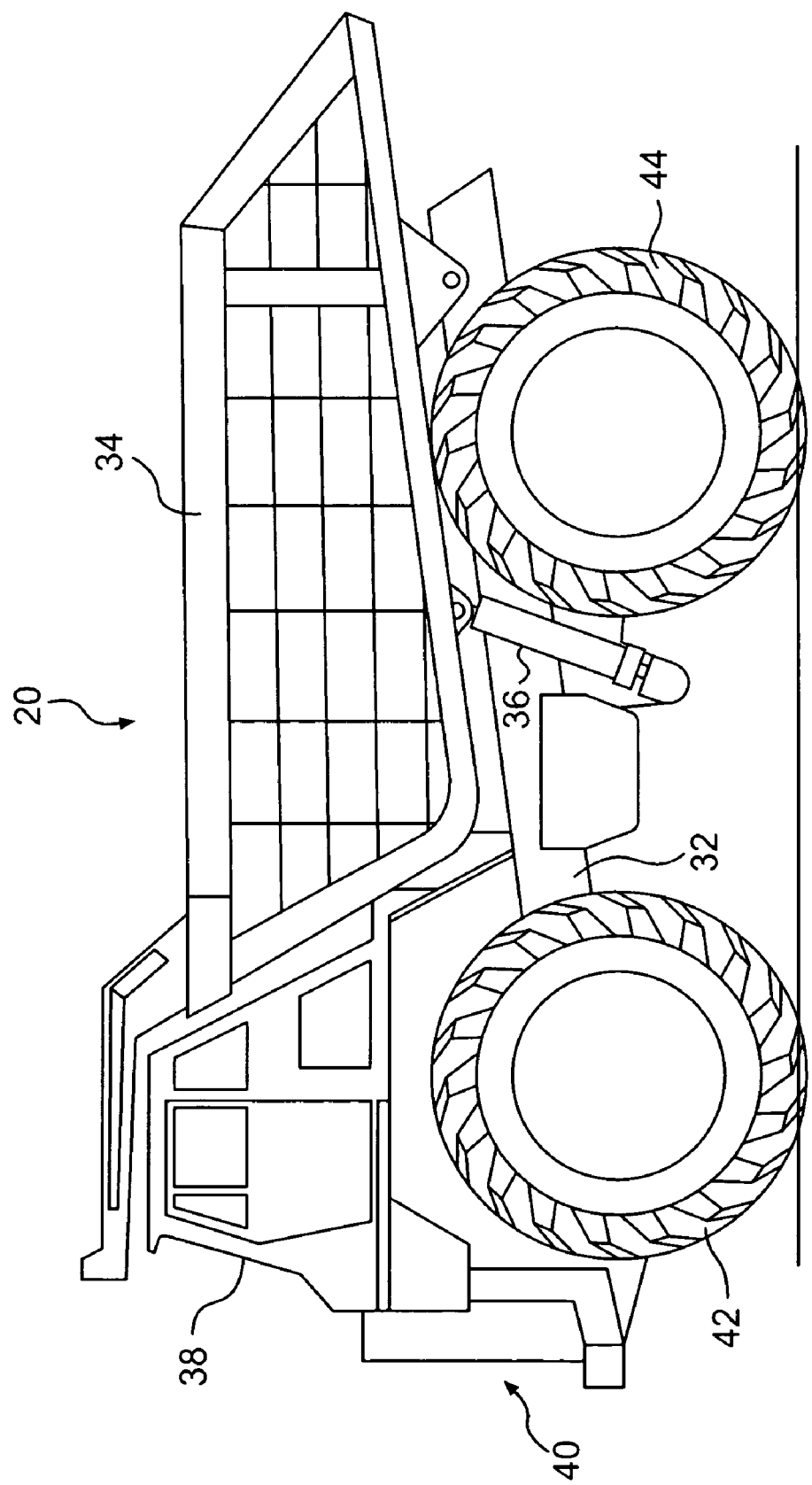
FIG. 2 is a diagrammatic illustration of an exemplary haulage vehicle.

FIG. 2 illustrates a typical haulage vehicle 20 which may be a large, off-road vehicle. It should be noted that the disclosed embodiment may be applicable to other types of haulage vehicles such as, for example, on-highway trucks or other earth moving machinery capable of carrying a payload. The vehicle 20 includes a frame 32 and a haulage body 34, which may be pivotally mounted to the frame 32 to allow dumping by means of actuator 36. An operator cab 38 is mounted on the front of the frame 32 above an engine enclosure 40. The vehicle 20 is supported on the ground by a pair of front wheels 42 and rear driven wheels 44. One or more engines (not shown) are housed in the engine enclosure 40 and may be used to provide power for the haulage vehicle 20.

Normally, the point of excavation within the mine 12 and the processing region 14 will be at different elevations. As a result, it is usual that the haulage vehicles 20 will transport excavated material along the haul roads at least in part from a lower elevation to a higher elevation. Ideally, the haul roads are designed with such a grade as to permit the haulage vehicles 20 to negotiate the portion of the haulage cycle from the excavation area within the mine 12 to processing region 14 while the haulage vehicles 20 are carrying a payload at or near the maximum rated payload for the haulage vehicle. In practice, haul roads may vary significantly from the ideal and the weight of one payload may likewise vary substantially from the weight of another payload.

The ability of a haulage vehicle to efficiently negotiate the haulage cycle along the haul roads is affected by a number of factors. For example, grade, grade variation, rolling resistance, and rolling resistance variation directly affect the power necessary to move a loaded vehicle, and this in turn affects fuel consumption. These same factors also affect the gear shift pattern employed by the vehicle operator and impact the stress on equipment components. This, in turn, affects cycle time, or the time needed to complete a haulage cycle, and down time required for component repair or replacement. The overall result of increased fuel consumption, increased cycle time, and down time is a decrease in production and an increase in cost. A desirable end would be to keep fuel consumption, cycle time, and down time at a minimum while meeting production quotas by hauling an economically efficient payload and while maintaining an economically efficient payload variation.

Thus, another factor affecting operational efficiency of the haulage system is payload and payload variation. If payloads are too great, equipment component life may suffer from stress to vehicle components. A less than optimum haul road surface character or grade coupled with too great a payload for a vehicle will compound vehicle stress as the heavily laden vehicle undulates along an uneven surface or struggles against too steep a grade. This may increase operational costs due to replacement parts and downtime. If payloads are too small, there is not an optimum balance among productivity, fuel usage, and operator cost. Accordingly, it is desirable to take payload and payload variation into account in maintaining optimum, desired, or target operational efficiency.

Because the ability of a haulage vehicle to efficiently negotiate a haulage cycle along haul roads is affected by numerous factors, monitoring technology for detecting and measuring the numerous parameters associated with haulage vehicle operation is well developed. Parameters or factors such as rimpull, grade tractive effort, vehicle speed, and torque at various locations along the drive train can be directly sensed, calculated based on other sensed conditions, or estimated by software based on sensed conditions. Rimpull is the force exerted where the haulage vehicle tires contact the road surface while grade tractive effort is the force resisting motion at a given speed for a given location on the haul route. Rimpull, along with vehicle speed, determines the actual power to the ground exerted by the vehicle. Actual power to the ground is a parameter that is desirably maximized to ensure efficiency of operation.

A business entity may be engaged in activities and endeavors such as manufacturing, selling, leasing, or otherwise providing equipment related to excavating and mining operations. In addition, such a business entity may develop significant expertise in analyzing the needs of haulage system operators and may be able to offer substantial benefits to the operators of a mining endeavor through its recommendations for modifications to the haulage system to make it more efficient, its recommendations for and provision of various equipment to facilitate and improve the haulage operation, and thus the mining endeavor, and its general expertise for optimizing or otherwise achieving idealized or desired targets in productivity and efficiency. In addition, such a business entity may have developed, over a period of research and development, equipment and systems capable of producing information sufficient, along with its developed expertise at deploying and using such equipment and systems, to fine tune a haulage system to an operational mode approaching optimum.

Figure 3:
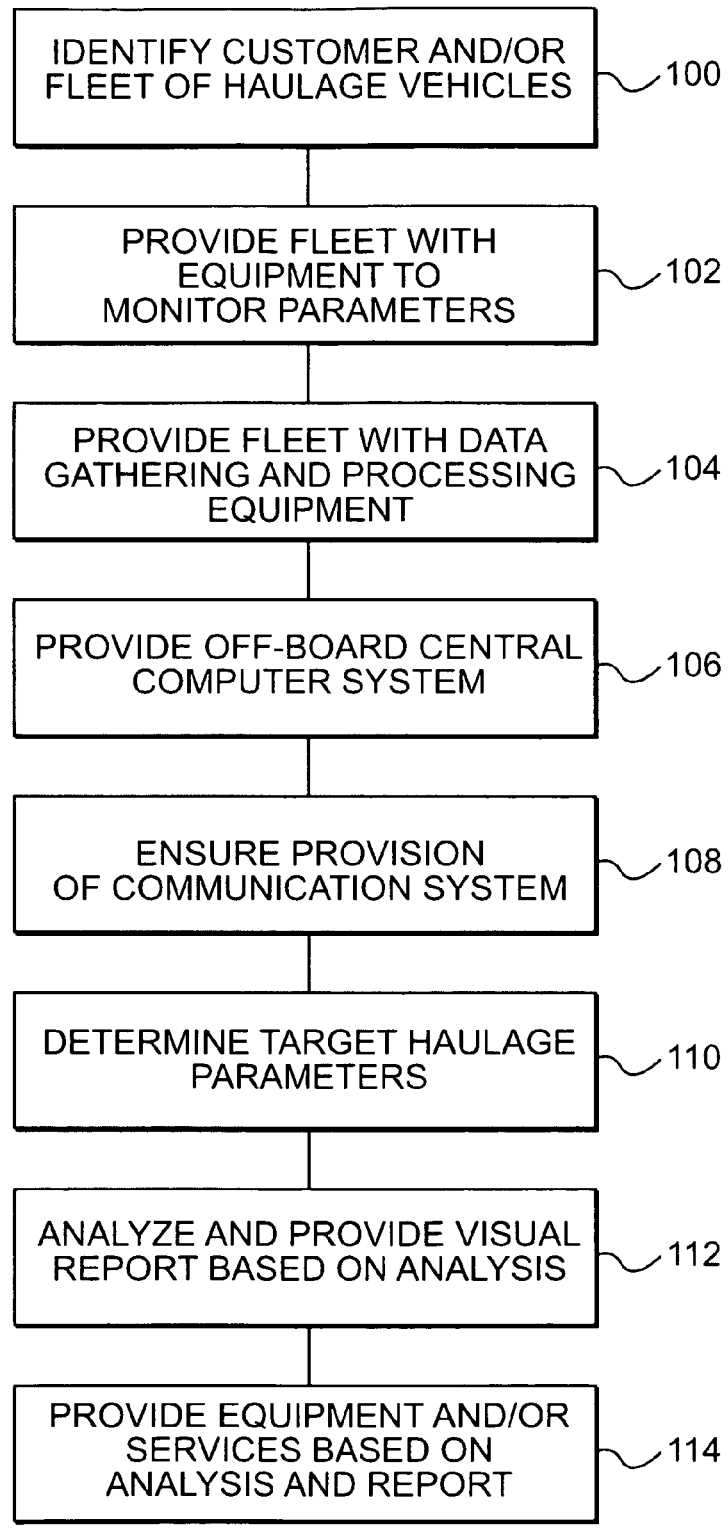
FIG. 3 is a flow diagram illustrating a disclosed embodiment.

Referring to the flow diagram in FIG. 3, a business entity possessing the capability of providing such a service may first identify, at 100, a customer, a fleet of haulage vehicles, or both. The customer may be, for example, the operator of a mining endeavor employing a haulage system with a fleet of haulage vehicles, who may benefit from such a service. The customer may be another entity that currently stands in a customer relationship with the business entity, or it may be another entity which is only a prospective customer. The customer need only be a person, persons, or an entity reasonably capable of benefiting from the service that may be provided by the business entity. This may be a customer who owns or operates a fleet of haulage vehicles. The term "identify" is intended to be broadly construed to encompass any methodology whereby a business entity capable of providing the disclosed services becomes aware of the actual or perceived need for the services by a third party.

Once a customer and/or a fleet of haulage vehicles is identified, the entity may equip, or otherwise take measures to provide for, at 102, the equipping of haulage vehicles of the fleet with a system or systems for monitoring various haulage parameters of the haulage vehicles. These parameters include, but are not limited to, torque at various points along the drive train, rolling resistance of the tires, payload, actual transmission gear along the haul route, operator gear selection along the haul route, vehicle speed, etc. Torque may be determined by way of a torque estimator system. Monitoring torque and payload may indicate the relationship between torque variations and payload variations. Thus, torque variations due to payload variations may be identified. Torque determination may enable evaluation of the impact of torque variation on relative life of equipment components and may enable identification of torque variations in haulage vehicle operation due to grade and rolling resistance variation.

Other parameters for which the entity may equip the fleet for monitoring may include grade of the haul road that the unit is traversing at a given time. Grade may be monitored by, for example, an on-board inclinometer or by way of GPS receivers which can calculate a change in elevation over a traversed distance as is well known in the art. Some parameters may be sensed directly and others may be derived from the sensed conditions, for example by calculations performed with software. Equipment for gathering information on haulage vehicle location may include a GPS solution or similar system.

In addition to having the haulage vehicles equipped with a monitoring system or systems, the entity may ensure the provision of, at 104, suitable equipment for gathering data on the monitored haulage parameters and for gathering information on haulage vehicle location. The data gathering equipment may include an on-board computer system having computer components such as processor and memory elements all programmed and configured to receive and process data generated by the monitoring equipment and otherwise perform calculations based on sensed parameters. In certain instances, the haulage vehicles may already have equipment for gathering certain data and this step may simply constitute making appropriate modifications to already-installed equipment.

The entity may ensure the provision, at 106, of an off-board central computer system programmed and configured for receiving and processing information from the entire fleet of haulage vehicles. The central computer system may be located proximate the haulage operation or may be located at a considerable distance remote from the haulage operation. The central computer system may be suitably programmed and configured to compare the information received from the fleet of haulage vehicles with predetermined data to yield results and generate analyses of the received and processed data. The predetermined data may be idealized data representative of a desired result. The central computer system may be configured to generate analyses in the form of visual representations such as, for example, printed reports and graphs which may form the bases for recommendations for modification of the haulage system tending to improve haulage efficiency. As with the on-board equipment, this step of providing an off-board central computer system may constitute modifying existing equipment.

To provide for communication and appropriate transfer of data between vehicles within the fleet and the central computer system, the entity may ensure the provision, at 108, of a suitable communication system. This communication system could include, for example, a satellite transmission system, a wireless communication system, or any other known manner for efficiently and reliably transmitting data from the fleet vehicles to the central computer system. Also, this step may simply include rendering the equipment to be compatible with an existing communication system.

The entity may take measures, at 110, to determine target haulage parameters which result in desired haulage system performance. These target parameters may be interchangeably characterized as optimum, target, or desired and are intended to embrace the particular parameters that, taken together, result in optimum, target, or desired productivity and efficiency in the haulage operation. Derivation of target parameters may be accomplished, for example, by use of simulation software, or by calculations based on data gathered over a period of time.

Determination of target haulage parameters may include drawing an economically efficient balance among minimum fuel usage, minimum equipment wear, minimum time for a haulage cycle, and minimum cost per unit weight of haulage, for example. Determination of target haulage parameters may also include, for example, determining an appropriate gear selection pattern for haulage vehicles of a fleet and, ultimately, determining an appropriate fleet selection. No single one of these factors is necessarily controlling in a given operation. It may be that each of these factors, as well as other factors, could be considered together to achieve a result where no single factor is either maximized or minimized. The desired overall haulage system performance may thus not necessarily maximize or minimize any of the component factors that make up the overall performance.

After target haulage parameters have been determined, the entity may then provide for, at 112, the analysis of data gathered from monitoring during actual haulage system performance by comparison with the target values, for example with the off-board central computer system. Data from the on-board computer systems may be transmitted to the off-board central computer system via the communication system. The central computer system may then perform analyses of gathered data and compare the results with, for example, the idealized and predetermined target parameters. The analyses performed by the central computer system may be tangibly fixed into a form conducive to further analysis by suitable personnel. For example, visual reports in printed form, may be produced based on the central computer system analyses.

The entity may then provide, at 114, equipment resources or services, or both equipment resources and services, to the customer for making necessary and desirable modifications to the haulage system commensurate with the determined deviations from target haulage system performance in order to improve productivity and efficiency. For example, the entity, having provided the monitoring, communicating, and data processing equipment and expertise, may then be able to provide a service of significant economic value to the mine operator by making particular recommendations for improving haulage system performance.

The entity may provide services through its expertise by making specific recommendations such as, for example, an alteration in the gear shift pattern employed by haulage vehicle operators. Considering the size of typical off-road haulage vehicles and the payloads involved, the gear shift pattern may affect fuel usage and cycle time significantly. Monitoring the gear shift pattern along with other vehicle parameters and analyzing the resulting data will suggest the effect on fuel usage and cycle time to an expert analyst and the necessary modifications to reduce fuel usage and/or increase cycle time. The overall result of such modifications may be an increase in efficiency of the haulage system.

A service that may be provided includes advising the customer that a change in equipment assigned to a given task is needed to reach target haulage system performance. This could include advising the customer to utilize more or less of existing equipment, or recommending other equipment, or a different fleet of haulage vehicles, be employed to optimize or otherwise increase efficiency of performance given current conditions. The service could also include advising the customer that more, or less, personnel are needed to reach target haulage system performance. Another service that may be provided is the creation of short and long term management reports to improve haulage system performance based on the analyzing of data to determine deviations from target haulage system performance. Such reports may serve the purpose of improving operational efficiency from a financial point of view, while maintaining production quotas. In addition, such reports may form the bases from which both short and long-term recommendations may be made to improve the overall efficiency of the operation.

In addition to or instead of providing particular services, the entity may be able to provide particular equipment which is necessary or advantageous in making modifications to the haulage system that improve its performance, such as, for example, machinery for improving the haul roads. Analysis may indicate that the haulage vehicles, or equipment associated with the haulage vehicles, may require upgrading or that otherwise different haulage equipment, or a different fleet of haulage vehicles, would improve overall operational efficiency. It is noted at this point that, for purposes of this disclosure, the haulage system comprises both the fleet of haulage vehicles and the system of haul roads.

INDUSTRIAL APPLICABILITY

The method and system for enabling and providing a service may find application in connection with large scale mining operations employing a fleet of off-road haulage vehicles traversing a system of haul roads. Referring back to FIG. 1, processing of the gathered monitoring data and comparison of that data to target values determined from simulation software, for example, may indicate significant deviation from target parameters at haul road segments CD, EF, and JK, with little deviation from target parameters at other haul road segments. The analysis may indicate that, for example, the grade of the haul road increased at segments CD, EF, and JK concomitantly with an increase in fuel usage and lost time in traversing the segments due to variance in operator shift pattern. The analysis may also indicate an erratic variation in rolling resistance along segment DE and JK, for example.

The entity may then offer a service by way of using its expertise in interpreting the analyzed data and making recommendations that the haul roads require a different grade at segments CD, EF, and/or JK, or that the character of the road surface requires modification at segments DE and/or JK. Haulage system components or haulage system design may be modified in view of data interpretation and analysis to achieve site specific haulage performance. In addition, the entity may have equipment resources available, particularly adapted for altering grade and otherwise improving a road surface, that can be sold or otherwise made available to the haulage system operator.

The fully installed system itself, placed within the control of the haulage system operator and generating short and long term reports based on the analysis of data, may constitute equipment and services provided by the entity to the customer. In such a situation, the initial provision of equipment for monitoring and processing the data to give results upon which a recommendation to the customer may be based would become equipment in the form of a management tool provided to the customer for purchase and exercise of control after receiving suitable training and instruction for using it.

A complex array of factors impacts a large scale haulage system such as, for example, a haulage system for an open-pit mining operation. As a result, a complex array of equipment has been developed to monitor these various factors. Out of this complexity comes a vast amount of data requiring expertise for its analysis and for the recommendations that may be made based on that analysis. A large scale mining operation may involve robust equipment for its haulage system, delicate and sensitive equipment for monitoring and measuring relevant parameters of the haulage system, sophisticated software for processing data gathered by the monitoring and measuring equipment, and reliable communications systems for transmitting data. It also may involve human resource concerns such as training and monitoring of personnel.

The disclosed systems enable and provide the overarching service that spans from providing the analytical equipment and expertise to determine causes of inefficiencies to implementing solutions for achieving target efficiencies. A mining operation may avail itself of this coordinated service from a single source, such as an entity capable of providing this service, and avoid a piecemeal approach to improving haulage system efficiency. An entity possessing sufficient equipment and personnel resources and the necessary expertise to understand both the problems associated with efficient operation of a haulage system in a large scale mining operation and their solutions is enabled through the disclosed system to offer this unified service.

The method and system disclosed may also be applicable for small scale mining or excavating operations with a small fleet of haulage vehicles and, for example, a single haul road. In addition, the method and system may be of value for an on-road haulage vehicle system involving the transportation of various materials in commerce such as, for example, liquids, fungible goods, distinctive items, or debris. Moreover, the haulage vehicles may be of various types such as, for example, vehicles capable of performing both excavating or material pick-up functions as well as haulage functions.

In the context of this disclosure, an "entity" is intended to include any type of organization, such as a corporation, for example, that is generally recognized as an entity or artificial person in a legal or business sense. Moreover, use of the singular "entity" is intended to be inclusive of the plural "entities" and may include various joint agreements generally recognized in the business world between entities of the same type or of different types.

It will be apparent to those skilled in the art that various modifications and variations can be made in the disclosed process and system without departing from the scope of the invention. Other embodiments of the invention will be apparent to those skilled in the art from consideration of the specification and practice of the invention disclosed herein. It is intended that the specification and examples be considered as exemplary only, with a true scope of the invention being indicated by the following claims.

What is claimed is:

1. A process of providing a service for improving haulage efficiency of a haulage system, comprising:
    determining target values associated with a target haulage efficiency for the haulage system;
    monitoring parameters of a plurality of haulage vehicles and parameters of at least one haul road traversed by the plurality of haulage vehicles, the monitored parameters including locations of the plurality of haulage vehicles along the at least one haul road, the at least one haul road being on a work site;
    gathering data on the monitored parameters;
    comparing the gathered data to the target values to:
        locate segments of the at least one haul road associated with deviations of the gathered data from the target values;
        determine grade modifications to the located segments of the at least one haul road commensurate with the deviations of the gathered data from the target values to bring the haulage efficiency closer to the target haulage efficiency;
    presenting results of the comparison of the gathered data to the target values in a report; and
    providing at least one of equipment or services for making the determined grade modifications based on the report.

2. The process of claim 1, wherein determining target values includes drawing an economically efficient balance among minimum fuel usage, minimum equipment wear, minimum time for a haulage cycle, and minimum cost per unit weight of haulage, while meeting any haulage production quotas.

3. The process of claim 1, wherein providing at least one of equipment or services includes providing machinery for modifying the grade of the least one haul road.

4. The process of claim 1, further comprising advising a customer that a change in equipment or personnel assigned to a given task is needed to improve haulage efficiency.

5. The process of claim 1, further comprising determining the location of the plurality of haulage vehicles on the at least one haul road with a positioning system associated with the plurality of haulage vehicles.

6. The process of claim 5, wherein the determining the location with a positioning system includes determining the location with a global positioning satellite receiver.

7. The process of claim 1, wherein determining target values includes employing simulation software to determine which grade or grade variation will improve haulage efficiency.

8. The process of claim 7, wherein determining target values further includes employing simulation software to determine which haulage vehicles, which gear selection pattern, and which payload or payload variation will improve haulage efficiency.

9. The process of claim 1, further comprising equipping at least some of the plurality of haulage vehicles with a torque estimator system.

10. The process of claim 9, further comprising estimating the torque output of the haulage vehicles equipped with the torque estimator system and identifying torque variations in haulage vehicle operation due to grade variation.

11. The process of claim 10, further comprising identifying torque variations in haulage vehicle operation due to rolling resistance variation.

12. A system for providing a service for improving haulage efficiency, comprising:
    monitoring equipment for monitoring parameters of a plurality of haulage vehicles and parameters of at least one haul road traversed by the plurality of haulage vehicles, the monitored parameters including locations of the plurality of haulage vehicles along the at least one haul road, the at least one haul road being on a work site;
    on-board computer systems adapted for installation on haulage vehicles in the plurality of haulage vehicles and configured to receive and process data generated by the monitoring equipment; and
    an off-board computer system configured to:
        receive and process information from the on-board computer systems and to compare the information with target values to yield results, the target values being associated with a target haulage efficiency for the haulage system, and
        generate at least one report presenting an analysis of the results yielded by the comparison made by the off-board computer system, the report including recommended grade modifications to the at least one haul road commensurate with deviations of the information from the target values for bringing the haulage efficiency closer to the target haulage efficiency.

13. The system of claim 12, further comprising torque estimators adapted to be associated with at least some of the plurality of haulage vehicles.

14. The system of claim 13, wherein the torque estimators are configured to estimate the torque output of the haulage vehicles equipped with the torque estimator system and to identify torque variations in haulage vehicle operation due to grade variation.

15. The system of claim 14, wherein the torque estimators are further configured to identify torque variations in haulage vehicle operation due to rolling resistance variation.

16. The system of claim 12, further comprising a positioning system configured to be associated with the plurality of haulage vehicles for determining the location of the plurality of haulage vehicles on the at least one haul road.

17. The system of claim 16, wherein the positioning system comprises a global positioning satellite receiver.

18. The system of claim 12, wherein the off-board computer system is further configured to employ simulation software to determine which grade or grade variation will improve haulage efficiency.

19. The system of claim 18, wherein the off-board computer system is further configured to employ simulation software to determine which haulage vehicles, which gear selection pattern, and which payload or payload variation will improve haulage efficiency.

20. The system of claim 12, wherein the target values draw an economically efficient balance among minimum fuel usage, minimum equipment wear, minimum time for a haulage cycle, and minimum cost per unit weight of haulage, while meeting any haulage production quotas.

* * * * *